United States Patent
Sato et al.

(10) Patent No.: US 7,711,244 B2
(45) Date of Patent: May 4, 2010

(54) VIDEO/AUDIO SYNCHRONIZING APPARATUS

(75) Inventors: Masaki Sato, Urayasu (JP); Toshio Oka, Yokohama (JP); Akino Inoue, Tokyo (JP)

(73) Assignee: Panasonic Corporation, Osaka (JP)

( * ) Notice: Subject to any disclaimer, the term of this patent is extended or adjusted under 35 U.S.C. 154(b) by 1405 days.

(21) Appl. No.: 10/493,932

(22) PCT Filed: Oct. 28, 2002

(86) PCT No.: PCT/JP02/11159

§ 371 (c)(1),
(2), (4) Date: Sep. 10, 2004

(87) PCT Pub. No.: WO03/039142

PCT Pub. Date: May 8, 2003

(65) Prior Publication Data

US 2005/0019020 A1    Jan. 27, 2005

(30) Foreign Application Priority Data

Oct. 29, 2001  (JP) ............................ 2001-330803

(51) Int. Cl.
*H04N 7/08* (2006.01)

(52) U.S. Cl. ............................ 386/92; 386/89; 386/96; 386/111

(58) Field of Classification Search ......... 386/124–125, 386/111, 48, 95, 45
See application file for complete search history.

(56) References Cited

U.S. PATENT DOCUMENTS

| 4,467,372 A * | 8/1984 | Juodenas | 360/31 |
| 5,953,485 A * | 9/1999 | Abecassis | 386/68 |
| 6,414,960 B1 * | 7/2002 | Kuhn et al. | 370/395.64 |
| 6,573,819 B1 * | 6/2003 | Oshima et al. | 386/111 |
| 6,611,150 B1 * | 8/2003 | Stevens | 324/613 |
| 6,654,956 B1 * | 11/2003 | Trinh et al. | 725/100 |

(Continued)

FOREIGN PATENT DOCUMENTS

JP          6-237443          8/1994

(Continued)

*Primary Examiner*—Thai Tran
*Assistant Examiner*—Helen Shibru
(74) *Attorney, Agent, or Firm*—Pearne & Gordon LLP

(57) ABSTRACT

A video and audio reproducing apparatus is provided with a re-synchronization controlling portion (20) for carrying out operation control with respect to re-synchronization of video and audio which are transmitted via an IP network, wherein the delay times of video data and audio data are controlled by the video delay controlling portion (21) and audio delay controlling portion (22), respectively, thereby carrying out re-synchronization. At this time, the re-synchronization controlling portion (20) judges re-synchronization timing on the basis of the audio level of audio data, encoding video type of video data, data transmission status and user operation, etc., and at the same time, judges the priority for which mode of the video priority mode or the audio priority mode the re-synchronization is carried out, on the basis of a fluctuation in the arrival time of audio data, data transmission status, contents of video data and audio data and user operation, etc. And, the delay amount for synchronization is determined by executing a prescribed re-synchronization algorithm at the re-synchronization timing to control the video delay controlling portion (21) and the audio delay controlling portion (22), wherein disturbances in video and audio can be mitigated when carrying out re-synchronization.

6 Claims, 11 Drawing Sheets

U.S. PATENT DOCUMENTS

| | | |
|---|---|---|
| 6,803,964 B1 * | 10/2004 | Post et al. ................ 348/423.1 |
| 6,909,677 B1 * | 6/2005 | Akiyama et al. ......... 369/47.27 |
| 2003/0038830 A1 * | 2/2003 | Bean et al. .................. 345/719 |
| 2003/0043784 A1 | 3/2003 | Selin |
| 2003/0043856 A1 * | 3/2003 | Lakaniemi et al. .......... 370/503 |
| 2006/0015348 A1 * | 1/2006 | Cooper et al. ............... 704/500 |
| 2006/0263056 A1 * | 11/2006 | Lin et al. ...................... 386/95 |

FOREIGN PATENT DOCUMENTS

| | | |
|---|---|---|
| JP | 8-46884 | 2/1996 |
| JP | 9-214936 | 8/1997 |

* cited by examiner

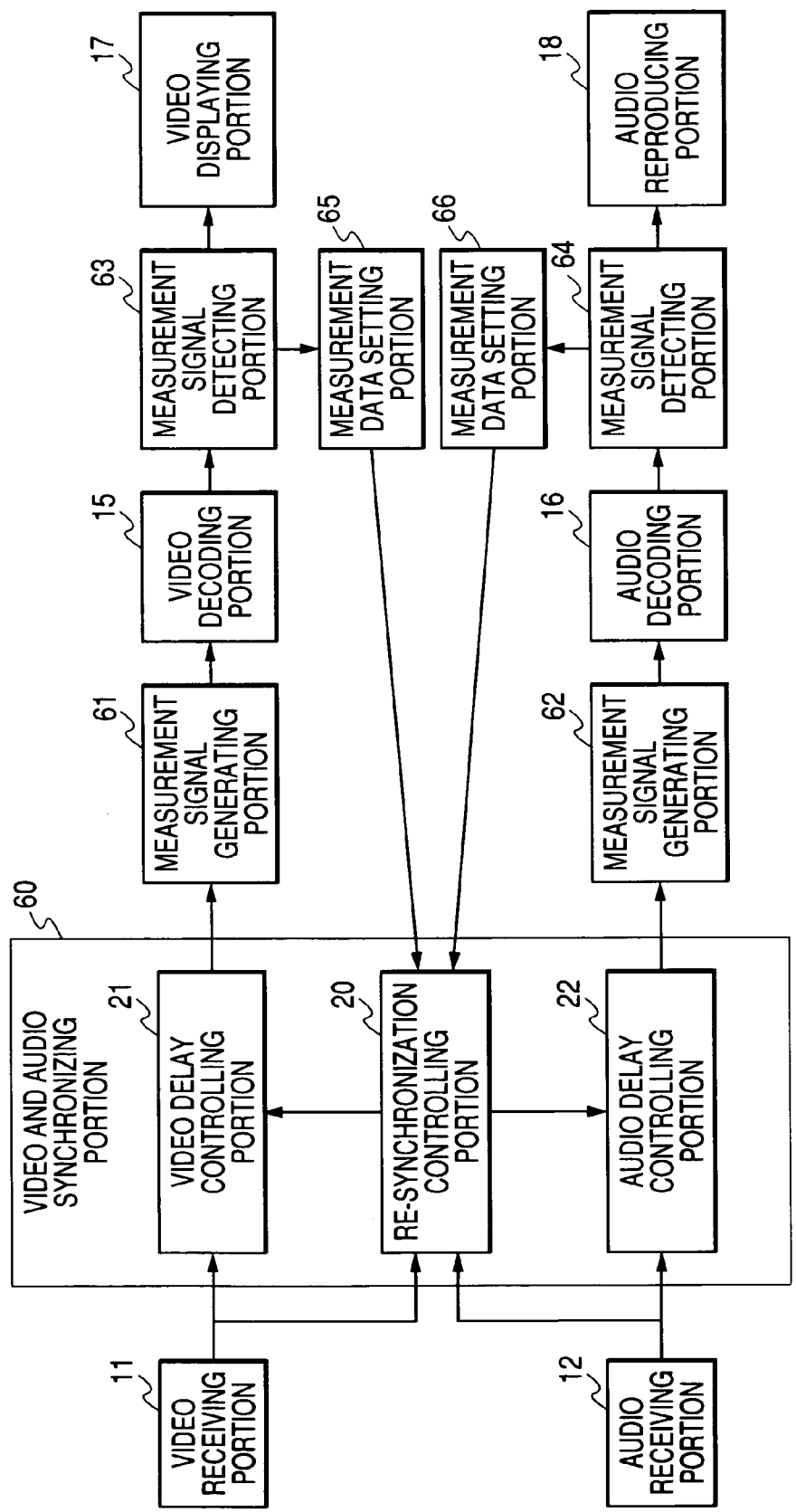

VIDEO/AUDIO SYNCHRONIZING APPARATUS

TECHNICAL FIELD

The present invention relates to a video and audio synchronizing apparatus for synchronizing reproduction timing of video and audio.

BACKGROUND ART

Recently, a video and audio reproducing apparatus has been used, which reproduces digitized video and audio that are transmitted via a communications line. For example, a moving image distribution system for transmitting moving image data by means of a local area network (a so-called LAN) and other networks such as the INTERNET, etc., and a moving image reproducing apparatus for reproducing moving image data transmitted via a network have been put into practical use.

In such a video and audio reproducing apparatus, for example, in an IP network that carries out data transmission by means of an IP (Internet Protocol), there may be a case where reproduction timing of video and audio lags due to a lag in data transmission time when transmitting packetized video and audio data. Video and audio are synchronized to correspond to such a case. In order to synchronize video and audio, it is common that at least any one of video and audio is delayed by using means for detecting a lag in the receiving time on the basis of time information added to received video and audio data and means for delaying signals to make reproduction timing of the video coincident with that of the audio, whereby the reproduction timing is adjusted to secure synchronization therebetween.

The following procedures for synchronizing video and audio have been conventionally employed:

(1) A delay amount is determined by obtaining a difference in the receiving time between a video packet and a audio packet by the lag detecting means when starting receiving data packets. (2) The delay amount thus determined is set in the delaying means, and hereafter, synchronization is secured by carrying out reproduction while delaying the received data. (3) The delaying amount is re-checked per packet or once every fixed interval in order to execute re-synchronization.

For example, Japanese Published Unexamined Patent Application No. H8-46884 has disclosed a technology for synchronizing video and audio in response to a difference in PTS using respective timing reference signals (PTS) of a video component and a audio component. Also, Japanese Published Unexamined Patent Application No. H9-214936 has disclosed a technology for carrying out re-synchronization by processing refresh process data while permitting delay up to an established permissible value of a processing delay where a decoding process of moving image data delays in response to conditions of a system and requesting refresh process data by clearing the received unprocessed moving image data where the delay exceeds the permissible value of processing delay.

There may be cases where synchronization lags due to a fluctuation in the receiving timing of a data packet during reproduction even if video and audio are once synchronized. As described in the above-described procedure (3), it is necessary to re-synchronize once every fixed interval. However, in prior art synchronizing methods, no device is considered with respect to the re-synchronization timing, wherein there may be cases where, due to discontinuity in reproduction signals when executing re-synchronization, video and audio are interrupted or are subjected to disturbances, and in such cases, viewers feel unnatural or uncomfortable.

DISCLOSURE OF THE INVENTION

In view of the above-described situations, the present invention has been developed. It is therefore an object of the invention to provide a video and audio synchronizing apparatus capable of reducing disturbances in video and audio when carrying out re-synchronization.

In addition, it is another object of the invention to provide a video and audio synchronizing apparatus capable of variably setting a delay reference value for synchronization in response to characteristics of its decoding portion.

The first aspect of the present invention is a video and audio synchronizing apparatus for carrying out synchronization when reproducing a plurality of content data including at least one of video data and audio data which are packetized and transmitted, which is featured in comprising means for judging the timing with respect to re-synchronization of the above-described plurality of content data, means for determining a delay amount for synchronization at a re-synchronization timing judged above, and means for delaying at least one of the above-described plurality of content data on the basis of the delay amount.

The second aspect of the invention is featured in comprising means for analyzing the above-described plurality of content data, wherein, on the basis of an analysis result brought about by the above-described data analyzing means, the above-described re-synchronization judging means judges, as re-synchronization timing, at least any one of the cases where one of the content data is audio data, and the audio level is continuous less than a prescribed level and where a sound which is not audio is continuous.

The third aspect of the invention is featured in comprising means for analyzing the above-described plurality of content data, wherein, on the basis of an analysis result brought about by the above-described data analyzing means, the above-described re-synchronization judging means judges, as re-synchronization timing, at least any one of the cases where one of the content data is video data, and the data are encoded video data in a frame and where a differential between the encoded video data in a frame and the data in the past frame is less than a prescribed value.

The fourth aspect of the invention is featured in comprising means for detecting a transmission status of the above-described re-synchronization judging means, wherein, on the basis of an analysis result brought about by the above-described transmission status detecting means, the above-described plurality of content data judges, as re-synchronization timing, in a case where a transmission error including any one of a packet loss, non-sequential arrival of packets as a transmission status of the above-described content data, and a transmission in which the arrival interval of packets is more than a prescribed value has occurred.

The fifth aspect of the invention is featured in comprising means for detecting an operation carried out by a user, wherein, on the basis of an analysis result brought about by the above-described user operation detecting means, said re-synchronization judging means judges it as re-synchronization timing that an operation regarding video or audio to be reproduced as a user operation is carried out.

The sixth aspect of the invention is featured in comprising means for judging priority, which judges which one of the above-described plurality of content data is synchronized with priority.

The seventh aspect of the invention is featured in comprising means for analyzing the above-described plurality of content data, wherein, on the basis of an analysis result brought about by the above-described data analyzing means, the priority judging means judges that, where the above-described plurality of content data are combinations of audio data and video data and a fluctuation in the arrival time of the audio data is shorter than the packet length of the audio data, the above-described video data are synchronized with priority.

The eight aspect of the invention is featured in comprising means for analyzing the above-described plurality of content data, wherein, on the basis of an analysis result brought about by the above-described data analyzing means, the priority judging means judges that, where the above-described plurality of content data are combinations of audio data and video data and a fluctuation in the arrival time of the audio data is longer than the packet length of the audio data, the above-described audio data are synchronized with priority.

The ninth aspect of the invention is featured in comprising means for analyzing the above-described plurality of content data, wherein, on the basis of an analysis result brought about by the above-described data analyzing means, the above-described priority judging means judges priority of data to be re-synchronized, in accordance with the above-described content data.

The tenth aspect of the invention is featured in comprising means for detecting a transmission status of the above-described plurality of content data, wherein, on the basis of a detection result brought about by the above-described transmission status detecting means, the above-described priority judging means judges priority of data to be re-synchronized, in accordance with the transmission status of packets of the above-described content data.

The eleventh aspect of the invention is featured in comprising means for detecting an operation carried out by a user, wherein, on the basis of a detection result brought about by the above-described user operation detecting means, the above-described priority judging means judges priority of data to be re-synchronized, in accordance with a user operation with respect to video or audio.

The twelfth aspect of the invention is featured in that re-synchronization information is added to the above-described content data at a prescribed timing suitable for re-synchronization when transmitting the content data, and the above-described re-synchronization judging means judges re-synchronization timing on the basis of the re-synchronization information.

In the present invention, timing for re-synchronization of a plurality of content data is judged on the basis of the audio level of audio data, encoding video type of video data, data transmission status and operation by a user, the delay amount for re-synchronization is determined at the timing of re-synchronization, and at least one of the plurality of content data is delayed on the basis of the delay amount, whereby re-synchronization is carried out. Also, at this time, in accordance with a fluctuation in the arrival time of audio data, a data transmission status, details of the content data, and an operation by a user, the priority is judged for which one of the data is re-synchronized with the top priority. Or, re-synchronization information is added to the content data at a prescribed timing suitable for re-synchronization when transmitting the content data, wherein the re-synchronization timing is judged by the re-synchronization information. Thereby, when carrying out re-synchronization, disturbances of the content data such as disturbances of video data, interruption of audio data, etc., are mitigated so that the disturbances are not made conspicuous.

In addition, measurement data are generated at the upstream side of the content data decoding means and are inserted into the content data. Subsequently, the measurement data are taken out from the content data in the downstream side of the decoding means and are sent to the synchronization controlling means. In the synchronization controlling means, a decoding processing time is obtained on the basis of the above-described measurement data, and the delay reference value for synchronization is determined, whereby it becomes possible to variably set the delay reference value for synchronization in response to the characteristics of the decoding portion even if the system of the decoding portion and characteristics thereof are changed.

BRIEF DESCRIPTION OF THE DRAWINGS

FIG. 11 is a block diagram showing a configuration of a video and audio reproducing apparatus including a video and audio synchronizing apparatus according to a fifth embodiment.

With respect to reference numbers used in the above-described drawings, reference number 11 denotes a video receiving portion, 12 denotes a audio receiving portion, 13, 41 and 60 denote video and audio synchronizing portions. Reference number 15 denotes a video decoding portion, 16 denotes a audio decoding portion, 17 denotes a video display portion, 18 denotes a audio reproducing portion, 20, 20*a*, 20*b* and 20*c* denote re-synchronization controlling portions. Reference number 21 denotes a video delay controlling portion, 22 denotes a audio delay controlling portion, 31, 36 and 43 denote re-synchronization judging portions, 32, 37 and 44 denote priority judging portions, 33 denotes a synchronization controlling portion, and 34 denotes a video packet analyzing portion. And, reference number 35 denotes a audio packet analyzing portion, 38 denotes a video packet transmission status measuring portion, 39 denotes a audio packet transmission status measuring portion, 42 denotes a user operation detecting portion, 61 and 62 denote measurement signal generating portions, 63 and 64 denote measurement signal detecting portions, 65 and 66 denote measurement data setting portions.

BEST MODE FOR CARRYING OUT THE INVENTION

Hereinafter, a description is given of embodiments of the present invention with reference to the accompanying drawings.

Figure 1:
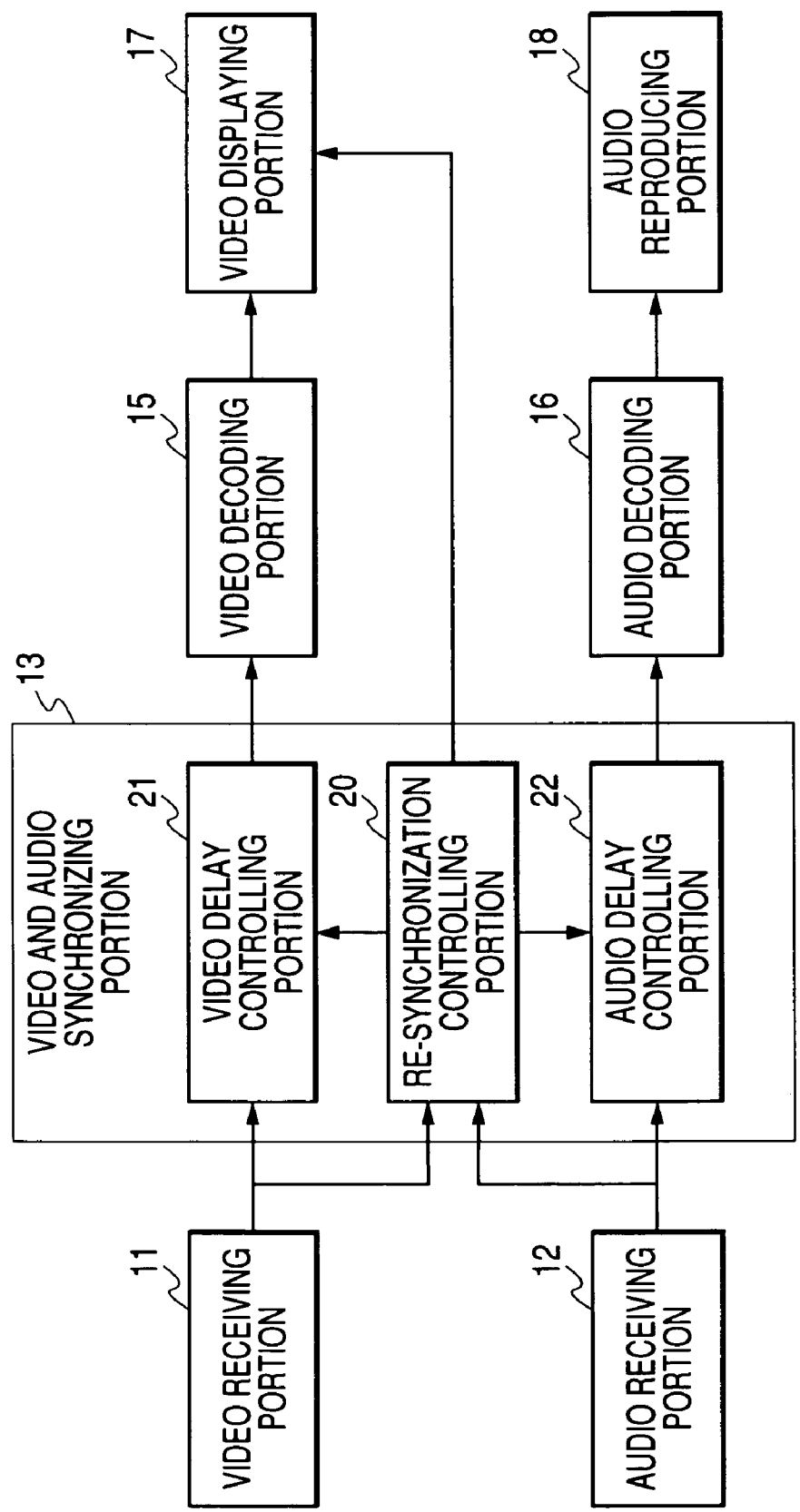
FIG. 1 is a block diagram showing a configuration of a video and audio reproducing apparatus including a video and audio synchronizing apparatus according to a first embodiment of the invention.

FIG. 1 is a block diagram showing a configuration of a video and audio reproducing apparatus including a video and audio synchronizing apparatus according to a first embodiment of the invention. In the present embodiment, a configuration example of a video and audio reproducing apparatus including a video and audio synchronizing apparatus is shown, which receives content data of packetized videos and audios that are transmitted through a communications line such as an IP network, etc., and reproduces the same, and the detailed operation thereof is described below.

The video and audio reproducing apparatus is provided with a video receiving portion 11 for receiving video data (video packets) proposed as the first content data, a audio receiving portion 12 for receiving audio data (audio packets) as the second content data, a video and audio synchronizing portion 13 for synchronizing videos and audios when reproducing the same, a video decoding portion 15 for decoding video data, a audio decoding portion 16 for decoding audio data, a video display portion 17 for displaying decoded video signals, and a audio reproducing portion 18 for reproducing decoded audio signals.

The content data referred to herein contain one or a plurality of media data (audio data and video data). Content data consisting of a plurality of media data show, for example, multiplexed audio and video streams and multi-media information streams consisting of audios, videos, still images and text.

The video and audio synchronizing portion 13 is provided with a re-synchronization controlling portion 20 for controlling operations with respect to re-synchronization, a video delay controlling portion (data delaying means) 21 for controlling a delay time of video data, and a audio delay controlling portion (data delaying means) 22 for controlling a delay time of audio data.

In the present embodiment, video data and audio data which are respectively received by the video receiving portion 11 and audio receiving portion 12 are respectively delayed by the video delay controlling portion 21 and the audio delay controlling portion 22 under control of the re-synchronization controlling portion 20 in the video and audio synchronizing portion 13, thereby adjusting the input timing thereof into the video decoding portion 15 and the audio decoding portion 16, wherein the video and audio are synchronized. Herein, in order to mitigate disturbances in video and audio when re-synchronizing the same, re-synchronization is carried out at any one of the following four timings.

(A) Re-synchronization is carried out where the audio level of input audio packets, which is less than a prescribed value, is continuous, or where audios which are not audios such as environmental audios are continuous.

(B) Re-synchronization is carried out where an input video packet is an encoding video (I-frame video) in a frame and where a differential between the current frame and the previous frame is small.

(C) Re-synchronization is carried out in accordance with a transmission status (packet loss, non-sequential arrival of packets, arrival interval of packets, etc.)

(D) Re-synchronization is carried out in accordance with an operation by a user (for example, to lower the volume and enlarge the video-displaying window).

By carrying out re-synchronization at the above-described timings, it is possible to make inconspicuous disturbances in the reproducing and outputting videos and audios even if non-continuity occurs in the video data and audio data. For example, even if audio data is slightly interrupted or an elongation process is carried out for data interpolation where the output level of audio is low, it is not conspicuous. Therefore, disturbances in video and audio are lowered, wherein re-synchronization can be carried out. In addition, if lag is large with respect to synchronization for frame videos having good quality images such as encoding videos in a frame, a user will have a large sense of incongruity, and correlation with the previous frame videos is low in the encoding videos in a frame, wherein re-synchronization can be executed at the timing of such frame videos so that disturbances in the videos and audios are made inconspicuous. Further, if the differential with respect to the last frame even in the encoding videos between frames is slight, disturbances of the videos will be made slight even if the input video packet is discarded. Therefore, re-synchronization can be executed at the timing so that the disturbance in videos is made inconspicuous. Also, where an inconvenience such as a packet loss occurs in data transmission or a user makes an operation, disturbance is brought about in videos and audios that are originally outputted. Therefore, re-synchronization can be executed before the disturbance becomes conspicuous.

Figure 2:
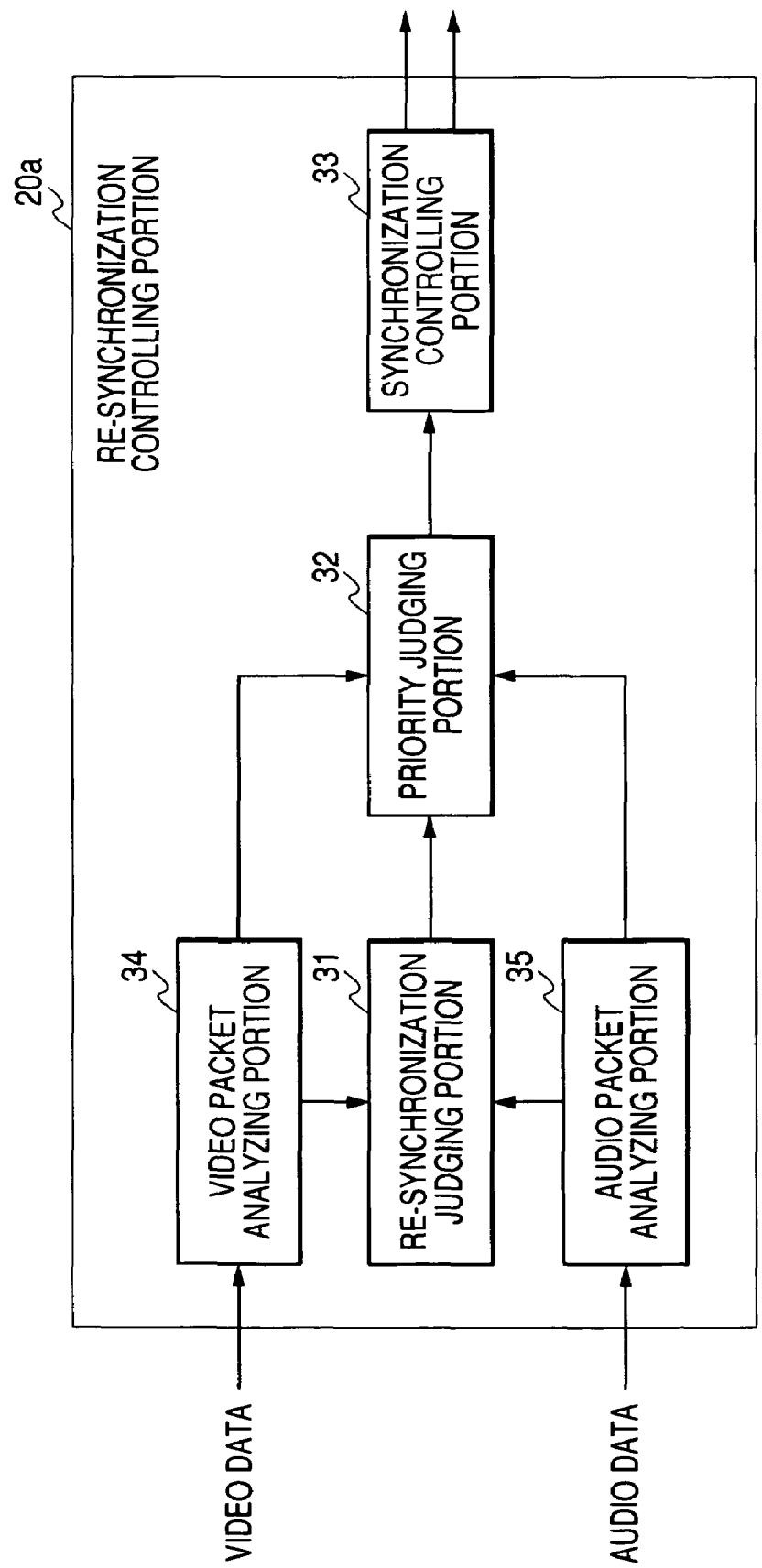
FIG. 2 is a block diagram showing a detailed configuration of a re-synchronization controlling portion according to the first embodiment.

FIG. 2 is a block diagram showing a detailed configuration of a re-synchronization controlling portion according to the first embodiment. The mode shown in FIG. 2 shows a construction in which re-synchronization is carried out at re-synchronization timing (A) and (B) described above.

A re-synchronization controlling portion 20a according to the first embodiment is provided with a re-synchronization judging portion (re-synchronization judging means) 31, a priority judging portion (priority judging means) 32, a synchronization controlling portion (synchronization controlling means) 33, a video packet analyzing portion (data analyzing means) 34, and a audio packet analyzing portion (data analyzing means) 35. The re-synchronization judging portion 31 judges whether or not the re-synchronization timing is reached. The priority judging portion 32 judges and determines for which one of video or audio the priority is placed with respect to synchronization. The synchronization controlling portion 33 executes a re-synchronization algorithm of video and audio and determines the delay amount of video and audio.

The video packet analyzing portion 34 analyzes whether or not a video packet received by the video receiving portion 11 is an encoding video (I-frame video) in a frame. The audio packet analyzing portion 35 judges the audio level of a audio packet received by the audio receiving portion 12.

In the first embodiment, based on the analysis results of the video packet analyzing portion 34 and the audio analyzing portion 35, the re-synchronization judging portion 31 judges whether the re-synchronization timing is reached, and where the re-synchronization is carried out, the priority judging portion 32 determines in which mode of video priority mode and audio priority mode the synchronization is carried out. Herein, where the audio level of a received audio packet is continuously less than a prescribed value, and where a received video packet is an encoding video in a frame, re-synchronization is carried out. For example, re-synchronization is carried out where the audio level becomes below 50 dB (which is a noise level in a quiet room) as the above-described prescribed value. In addition, the prescribed value is not limited to the above-described value, wherein an optionally adequate value may be used in accordance with the system configuration and environmental conditions.

Or, re-synchronization may be carried out where the differential with the last frame is less than the prescribed value in the video packet. In this case, for example, the prescribed value may be set per macro block that becomes the unit of video encoding process, wherein, by utilizing a "not_coded" flag showing that the macro block does not include any encoding information in the frame, it is possible to evaluate the differential with the last frame. In the present example, even if the differential with the last frame is less than the prescribed value where the "not_coded" flag is set in macro blocks exceeding 231 blocks which are equivalent to 70% among 330 macro blocks that compose an image whose resolution is 352×240 pixels, re-synchronization is carried out. Also, the prescribed value is not limited to the above-described value, wherein any optional value may be employed in accordance with the system configuration and data format, etc.

Since, where a fluctuation in the arrival time of audio packets received by the audio receiving portion 12 is smaller than the audio packet length, disturbances in audio due to an elongation process of audio data are slight, re-synchronization is carried out in the video priority mode. In the video priority mode, audio data are transmitted to the audio decoding portion 16 on the basis of the input timing of video data into the video decoding portion 15. Herein, where the input timing of audio data for which re-synchronization is delayed is delayed, and interruption of audio is brought about, an elongation process of audio data is carried out to eliminate the interruption.

Since, where a fluctuation in the arrival time of a audio packet received by the audio receiving portion 12 exceeds the audio packet length, disturbance in audio is increased due to an elongation process of the audio data, re-synchronization is carried out in the audio priority mode. In the audio priority mode, video data are transmitted to the video decoding portion 15 on the basis of the input timing of audio data into the audio decoding portion 16. In this case, the input timing of audio data is quickened so that the audio is not interrupted. Also, where the receiving timing of the video packet is delayed over one frame with respect to the audio, the video displaying portion 17 is given an instruction of not displaying any video, whereby display of the video which lags from its audio is prevented, thereby preventing disturbances in the video.

Further, judgment of the priority of video and audio may be carried out in accordance with the content of audio data and video data in addition to the above examples, wherein, for example, priority may be placed on video when the audio level is low, or priority may be placed on video when the video is an I-frame video.

Figure 3:
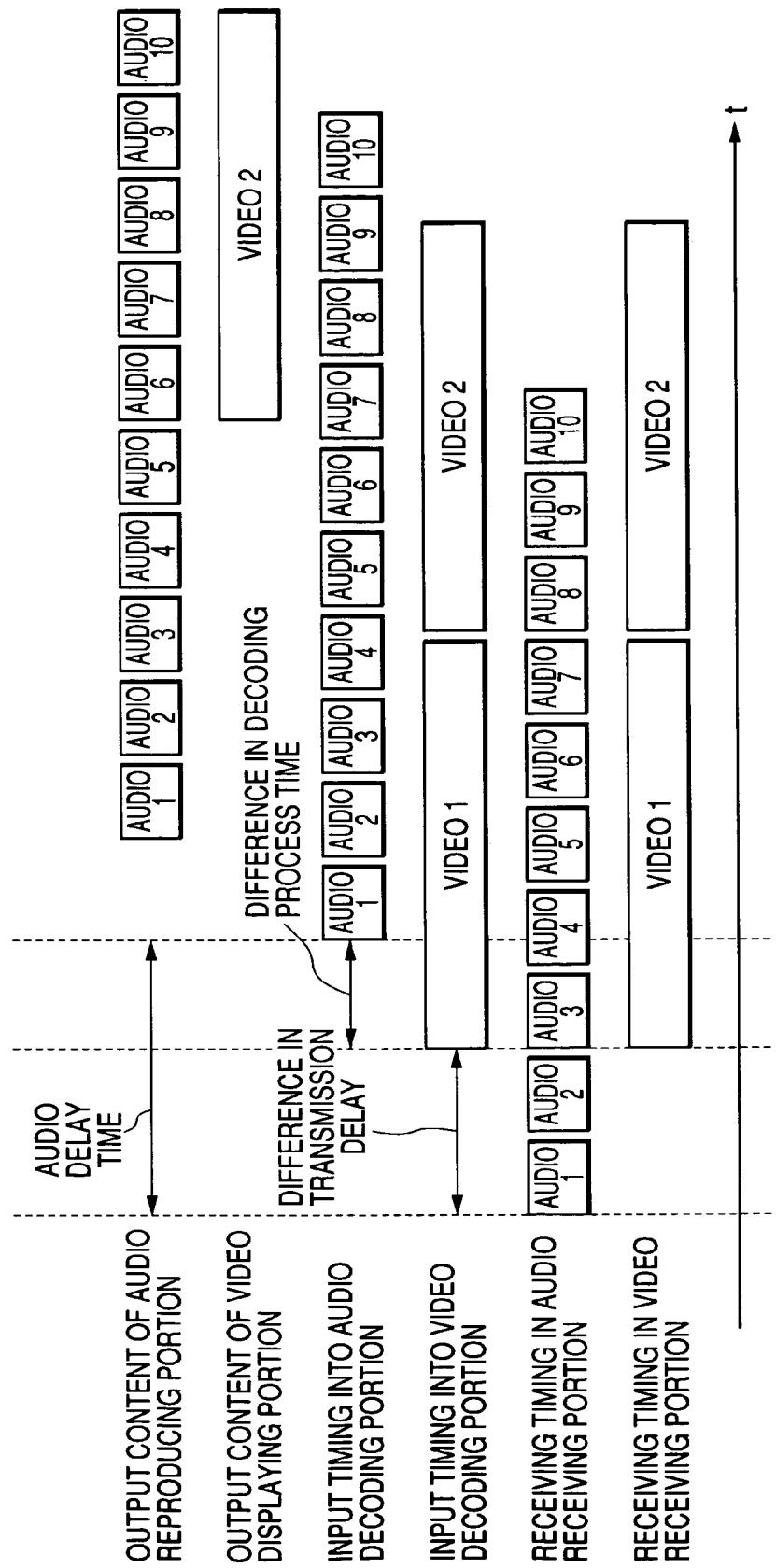
FIG. 3 is a timing chart showing input and output timing at respective portions of video data and audio data.

Herein, a detailed description is given of synchronization of video and audio. FIG. 3 is a timing chart showing input and output timing at respective portions of video data and audio data. Usually, in connection to the receiving timing of video data and audio data, the receiving timing of video packets is delayed in the video receiving portion 11 from the receiving timing of audio packets in the audio receiving portion 12 since a difference in the transmission delay is brought about in communications lines such as a network, etc. Taking the difference in transmission delay and difference in a decoding process in the audio decoding portion 16 and video decoding portion 15 into consideration, these differences in time are added to be made into a audio delay time, wherein the input timing of audio data into the audio decoding portion 16 is delayed. Thereby, the timing of output content in the audio reproducing portion 18 is made coincident with the timing of output content in the video displaying portion 17, wherein synchronization of video and audio can be secured.

Figure 4:
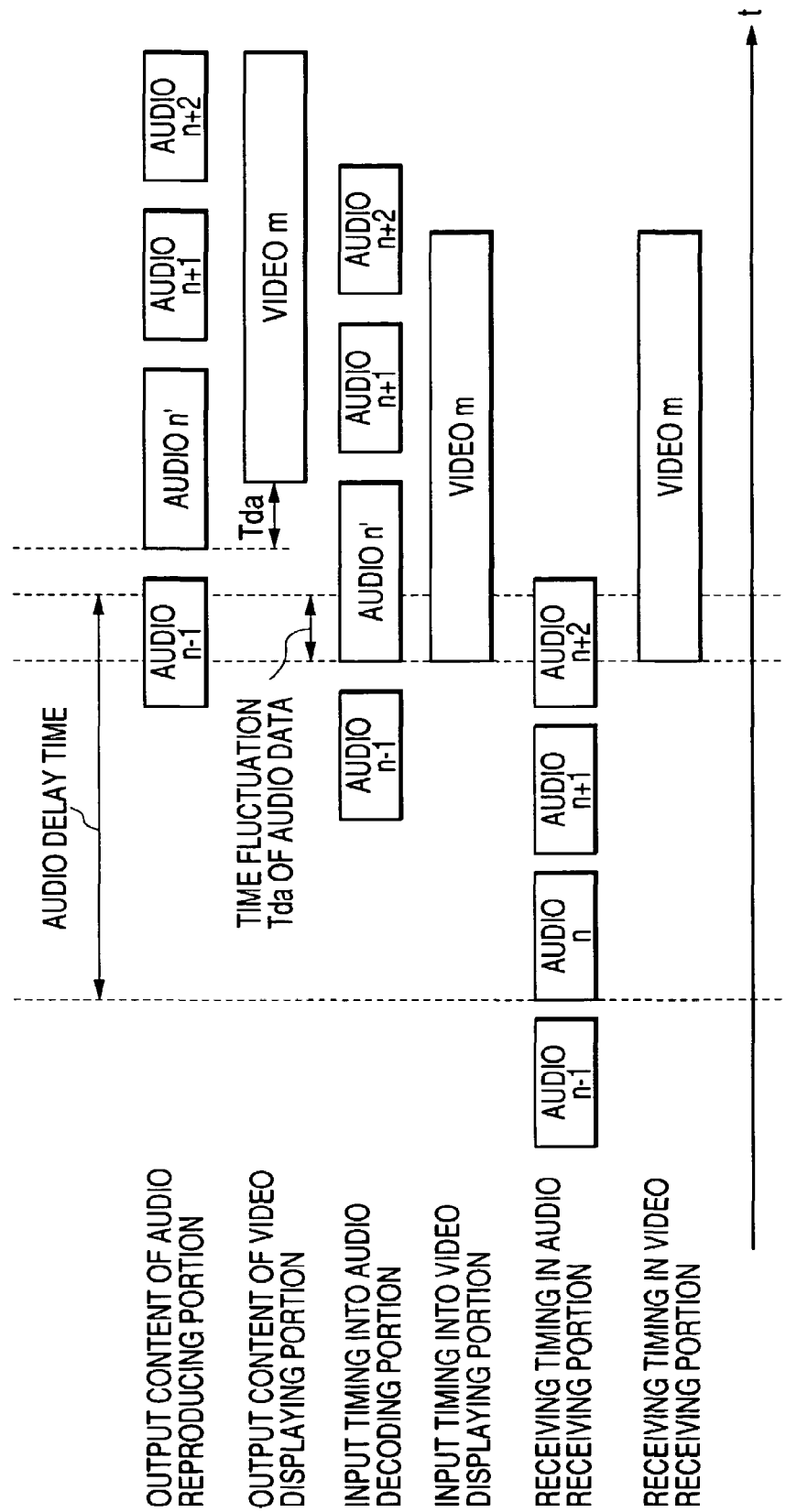
FIG. 4 is a timing chart showing input and output timing at respective portions of video data and audio data when carrying out re-synchronization in the video priority mode.

FIG. 4 is a timing chart showing input and output timing at respective portions of video data and audio data when carrying out re-synchronization in the video priority mode. In addition, hereinafter, a case is illustrated, where re-synchronization is carried out with audio n, n+1, and n+2 corresponding to video m. In the case of the video priority mode, the input timing of audio data is adjusted on the basis of the input timing of video data into the video decoding portion 15, and the audio data are sent to the audio decoding portion 16.

In the example shown in FIG. 4, a case is illustrated, where, with respect to audio delay time (delay reference value) to secure synchronization by making the output timing of the audio reproducing portion 18 coincident with that of the video displaying portion 17, the input start timing of audio data into the audio decoding portion 16 comes early and a fluctuation Tda in time of the audio data is generated. In this case, if the audio data are delayed on the basis of the timing of the video data, the audio is interrupted. In order to prevent the audio from being interrupted, an elongation process for interpolating the audio data like audio n' is carried out, and the audio is inputted into the audio decoding portion 16. For example, as shown in FIG. 4, there is a case where the value of the fluctuation Tda of audio data becomes lower than one frame of audio, wherein if the general audio frame is made into 20 msec, and the value of the fluctuation Tda is made into 10 msec, the audio data n' is elongated to data equivalent to 30 msec, by the audio data interpolating process. Also, the value used for the elongation process is not limited to the above-described value. Any optionally adequate value may be employed in accordance with the system configuration and data format, etc. With such an operating process, the audio is re-synchronized on the basis of the output timing of video, wherein it becomes possible to prevent disturbances of the audio when re-synchronization is carried out.

Figure 5:
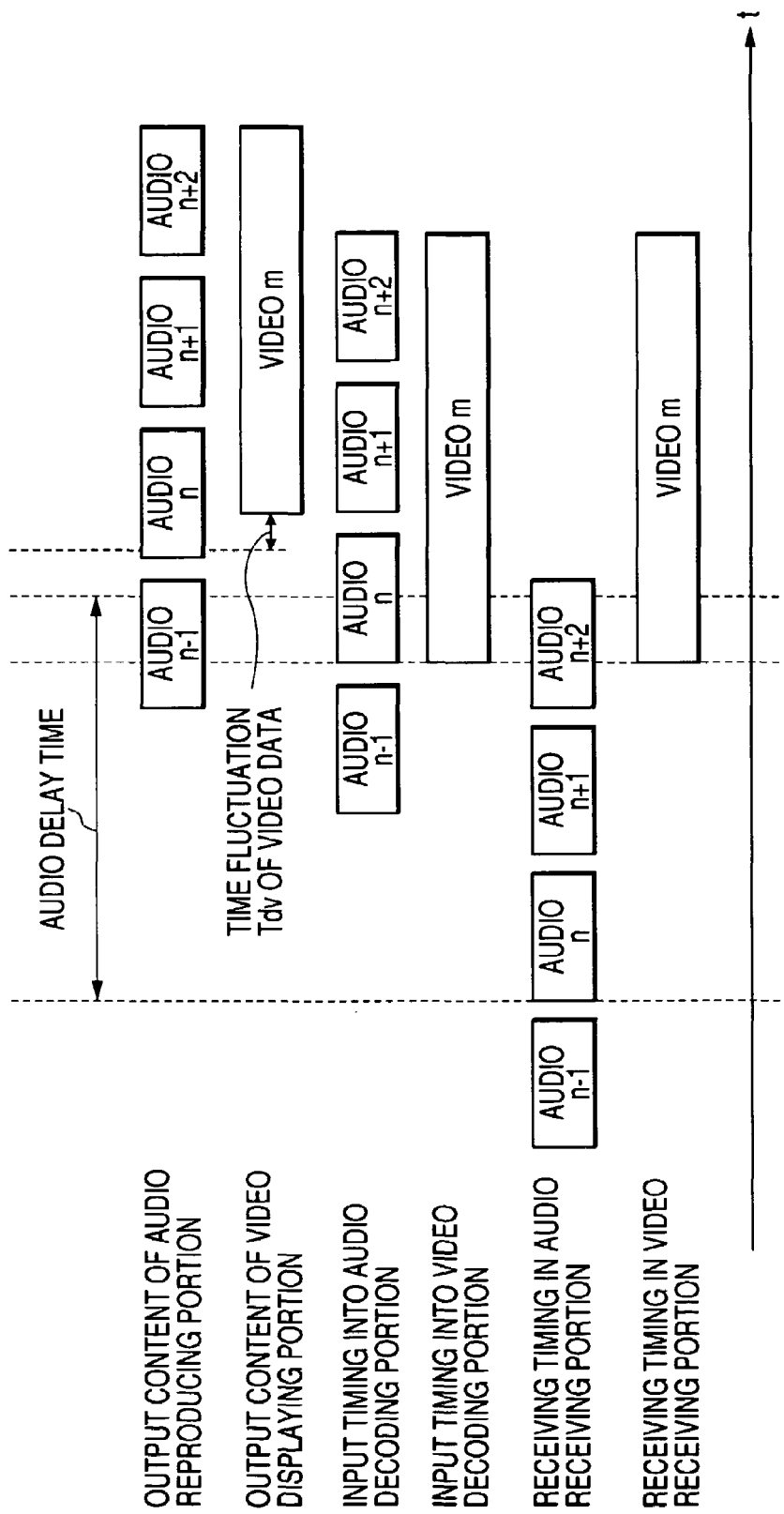
FIG. 5 is a timing chart showing input and output timing at respective portions of video data and audio data where a fluctuation in time of the video data is small when carrying out re-synchronization in the audio priority mode.

FIG. 5 is a timing chart showing input and output timing at respective portions of video data and audio data where a fluctuation in time of the video data is small when carrying out re-synchronization in the audio priority mode. In the case of the audio priority mode, the input timing of video data is adjusted on the basis of the input timing of the audio data into the audio decoding portion 16, and the video data are sent to the video decoding portion 15.

The example shown in FIG. 5 shows a case where, with respect to the audio delay time and video delay time to make the output timing of the audio reproducing portion 18 coincident with that of the video displaying portion 17, the input start timing of video data into the video decoding portion 15 is delayed and a fluctuation Tdv in time of the video data is brought about. In this case, in order to synchronize the video data with the audio data, the output time of video data in the video displaying portion 17, that is, the displaying time of the video is shortened. For example, where the general audio frame is made into 20 msec and the value of fluctuation Tdv is made into 10 msec, when the value of the fluctuation Tdv in time of the video data is less than one frame of the audio as shown in FIG. 5, re-synchronization is secured by delaying the input timing of video data by the value 10 msec, of the fluctuation Tdv. In this case, in order to prevent disturbances of video and audio, the output time of the video data m in the video displaying portion 17 is shortened by the value 10 msec of the fluctuation Tdv. Also, the input timing is not limited to the above-described value, wherein any optionally adequate value may be employed in accordance with the system configuration and data format, etc. With such an operation process, it becomes possible to re-synchronize the video to the output timing of audio while preventing disturbances in the video and audio.

Figure 6:
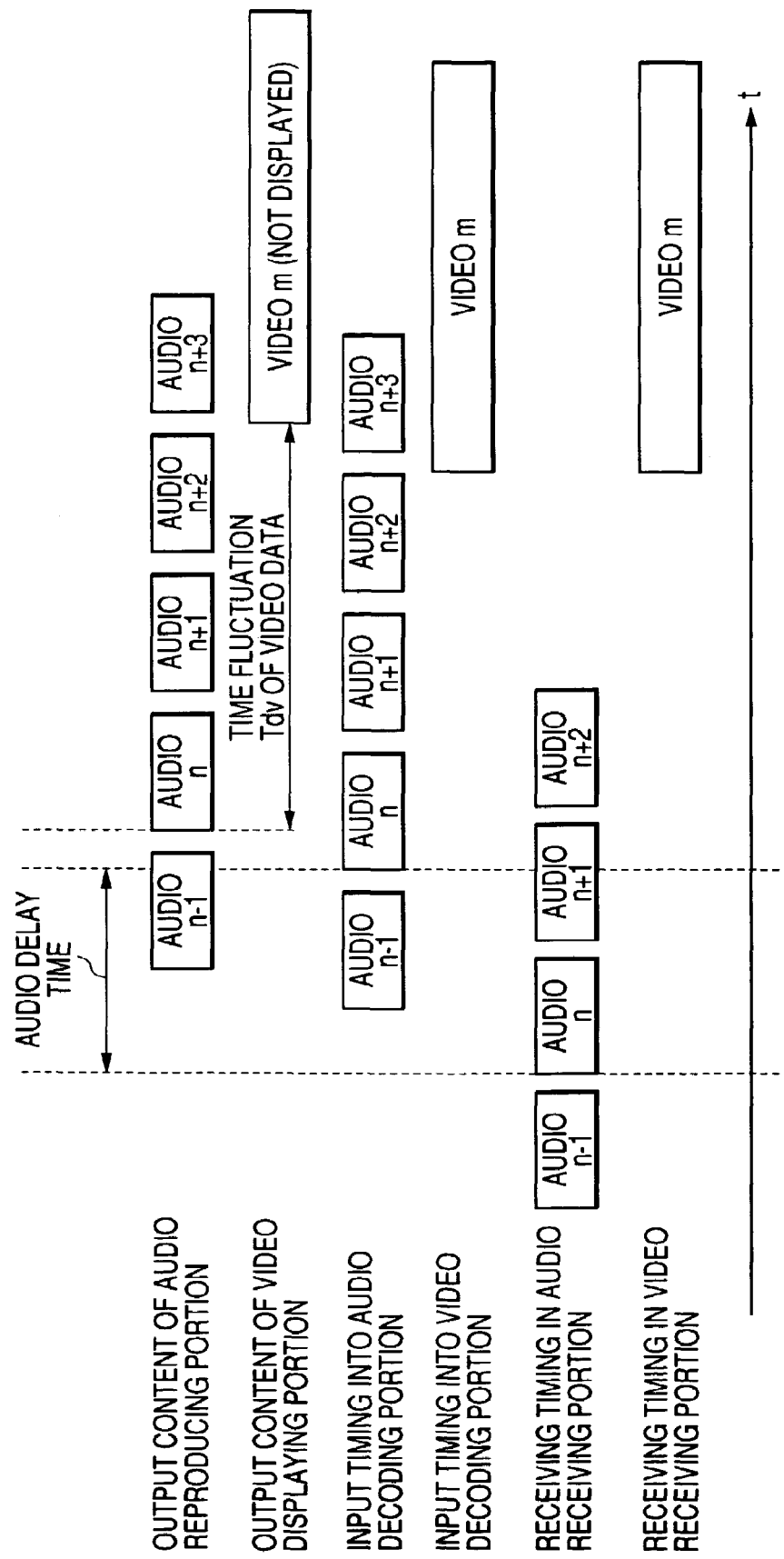
FIG. 6 is a timing chart showing input and output timing at respective portions of video data and audio data where a fluctuation in time of the video data is large when carrying out re-synchronization in the audio priority mode.

FIG. 6 is a timing chart showing input and output timing at respective portions of video data and audio data where a fluctuation in time of the video data is large when carrying out re-synchronization in the audio priority mode. The example shown in FIG. 6 shows a case where, with respect to the audio delaying time and video delaying time for making the output timing of the audio reproducing portion 18 coincident with that of the video displaying portion 17, the input start timing of the video data into the video decoding portion 15 is delayed by one frame or more with respect to the audio, and the fluctuation Tdv in time of the video data is large. In this case, since audio n, n+1 and n+2 corresponding to the video m have already been outputted and audio data n+3 is audio corresponding to the next video data m+1, the data of the video m that does not come in time is not displayed in the video displaying portion 17. For example, where the general audio frame is made into 20 msec, and the value of fluctuation Tdv is made into 60 msec, when the value of the fluctuation Tdv in time of the video data exceeds one frame of audio as shown in FIG. 6, the video data m delayed to a large extent is not reproduced in the video displaying portion 17. Also, the values are not limited to the above-described values. Any optionally adequate values may be employed in accordance with the system configuration and data format, etc.

Where the delayed video data is not displayed, the video data are not discarded even where the encoding video (I-frame video) in a frame is delayed more or less and is not displayed. On the other hand, where the encoding video (P-frame video) between frames is not displayed, the video data are discarded. If the I-frame video is discarded, contradiction is brought about in the information for decoding a subsequent P-frame video, wherein the image quality is lowered. Therefore, the I-frame video is retained so as to be used in decoding. With such an operation process, the video that is delayed for re-synchronization and does not come in time is not displayed, wherein it becomes possible to prevent disturbances in the video and audio.

Figure 7:
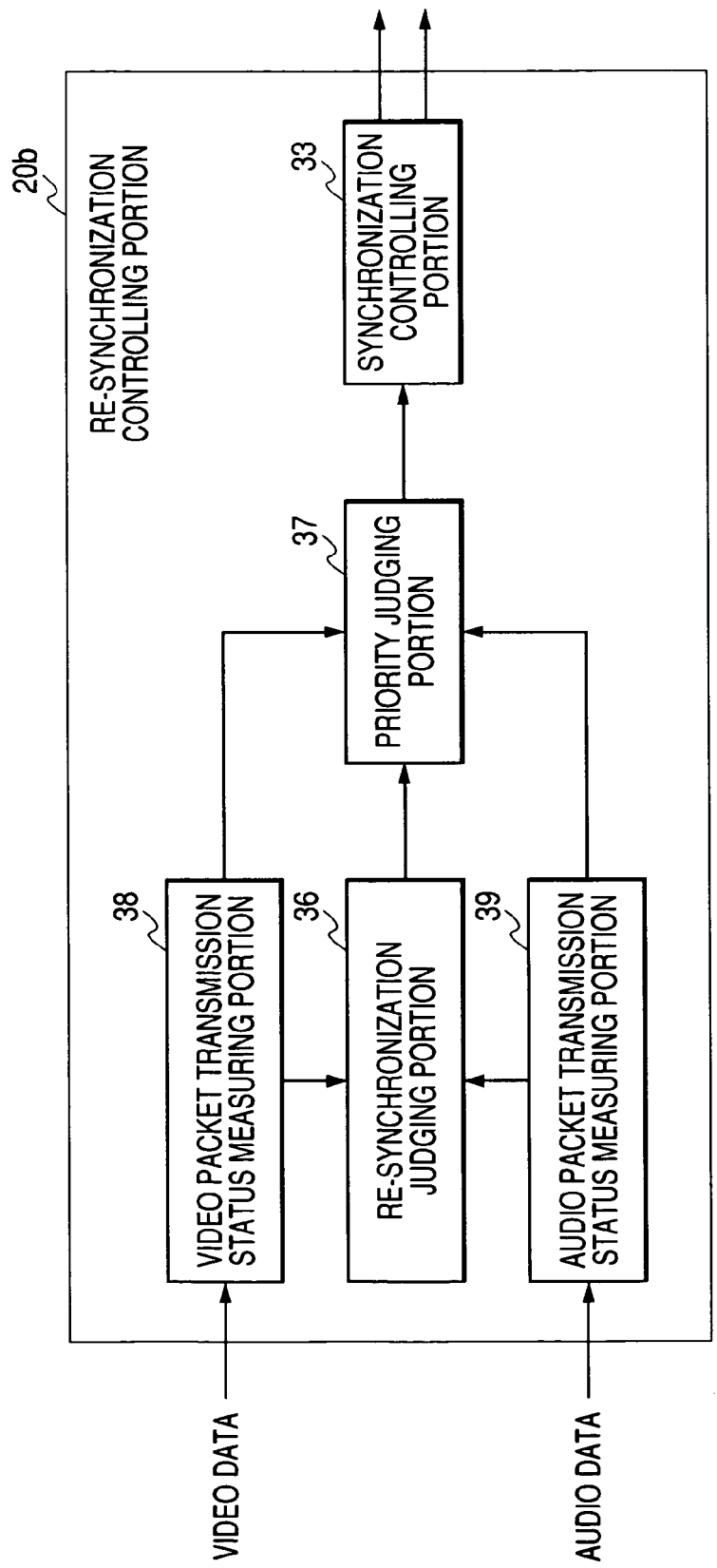
FIG. 7 is a block diagram showing a detailed configuration of a re-synchronization controlling portion according to a second embodiment.

FIG. 7 is a block diagram showing a detailed configuration of a re-synchronization controlling portion according to a second embodiment. The example shown in FIG. 7 shows a configuration for carrying out re-synchronization at a re-synchronization timing shown in (C) described above.

The re-synchronization controlling portion 20 according to the second embodiment is provided with a re-synchronization judging portion 36, a priority judging portion 37, a synchronization controlling portion 33, a video packet transmission status measuring portion (data transmission status detecting means) 38, and a audio packet transmission status measuring portion (data transmission status detecting means) 39. The video packet transmission status measuring portion 38 measures the receiving status of a video packet received by the video receiving portion 11. The audio packet transmission status measuring portion 39 measures the receiving status of a audio packet received by the audio receiving portion 12.

In the second embodiment, on the basis of the results of measurement regarding the packet transmission status in the video packet transmission status measuring portion 38 and the audio packet transmission status measuring portion 39, the re-synchronization judging portion 36 judges whether or not the re-synchronization timing is reached, and at the same time, where re-synchronization is carried out, the priority judging portion 37 determines in which mode of the video priority mode or the audio priority mode the synchronization is carried out. Herein, re-synchronization is carried out in a transmission status where transmission abnormality of packets occurs, for example, cases where, when transmitting video packets and audio packets, a packet loss is brought about, arrival order of packets is changed, and the arrival interval between packets exceeds a prescribed value. For example, where 10 msec that is 50% of the cases where the length of a audio frame is 20 msec is made into the prescribed value and the arrival interval between audio packets exceeds the prescribed value 10 msec, re-synchronization is carried out. In addition, the prescribed value is not limited to the above-described value. It may be set to any optionally adequate value in accordance with the system configuration and data format, etc.

Also, at this time, synchronization is secured in accordance with the receiving timing of video packets and audio packets as in the first embodiment, that is, with priority placed on the video packet or audio packet having a normal transmission status. Operation for re-synchronization may be executed in accordance with the procedures similar to those in the first embodiment described above.

Since video or audio is necessarily disturbed where a packet loss is brought about, re-synchronization is carried out in accordance with the timing of such a transmission status, wherein it is possible to make the disturbances of video and audio inconspicuous in re-synchronization.

Figure 8:
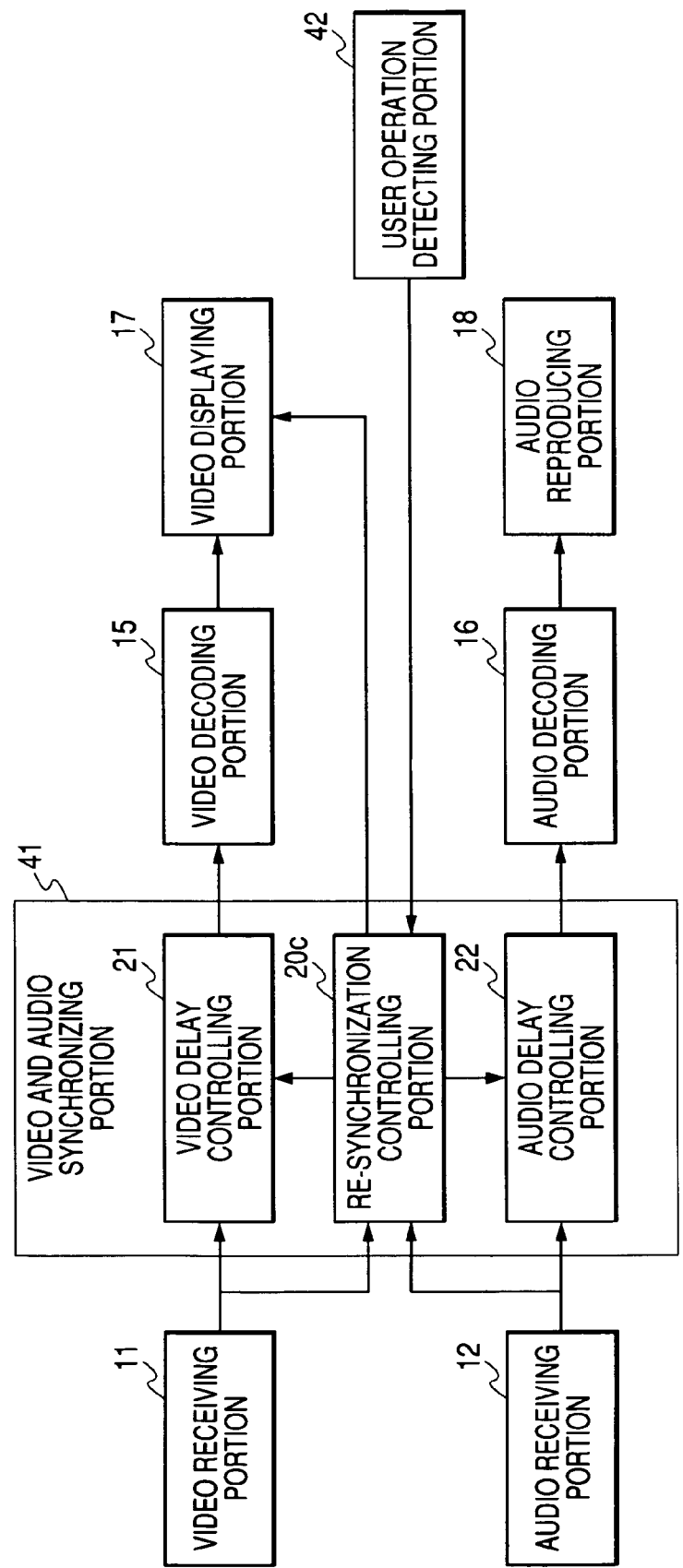
FIG. 8 is a block diagram showing a configuration of a video and audio reproducing apparatus including a video and audio synchronizing apparatus according to a third embodiment.
Figure 9:
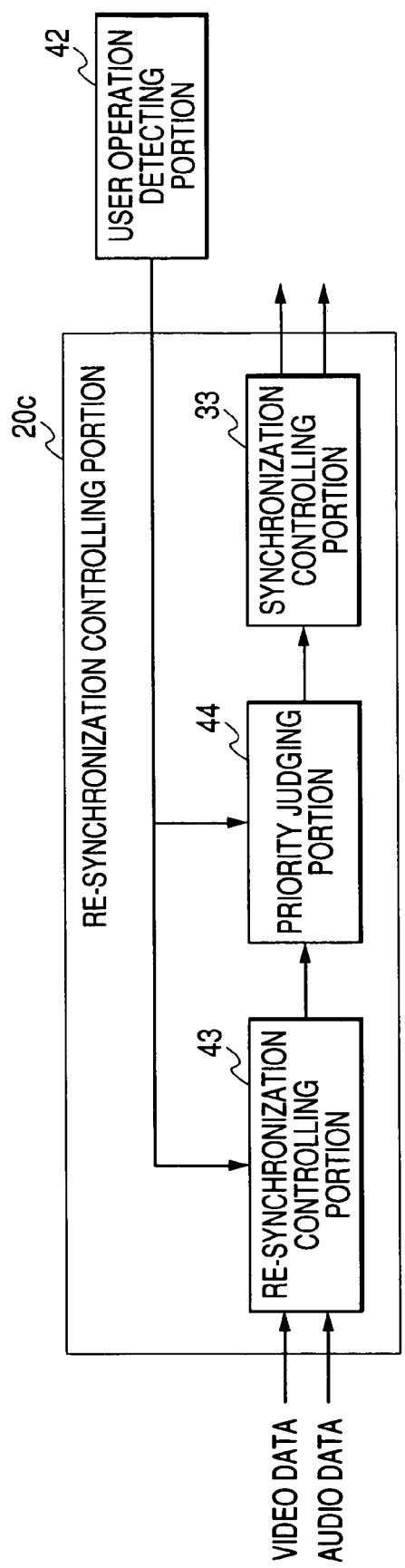
FIG. 9 is a block diagram showing a detailed configuration of a re-synchronization controlling portion according to the third embodiment.

FIG. 8 is a block diagram showing a configuration of a video and audio reproducing apparatus including a video and audio synchronizing apparatus according to a third embodiment. FIG. 9 is a block diagram showing a detailed configuration of a re-synchronization controlling portion according to the third embodiment. The example shown in FIG. 8 and FIG. 9 shows a configuration for carrying out re-synchronization at the re-synchronization timing shown in (D) described above.

A video and audio reproducing apparatus according to the third embodiment is provided with a user operation detecting portion (user operation detecting means) 42 for detecting an operation by a user. The video and audio synchronizing portion 41 synchronizes video and audio, including the result of detection, which is brought about by the user operation detecting portion 42. The re-synchronization controlling portion 20c of the video and audio synchronizing portion 41 is provided with a re-synchronization judging portion 43, a priority judging portion 44 and a synchronization controlling portion 33.

In the third embodiment, the re-synchronization judging portion 43 judges, on the basis of the detection result for a user operation in the user operation detecting portion 42, whether or not the timing of re-synchronization is reached. Where re-synchronization is carried out, the priority judging portion 44 determines for which mode of the video priority mode or the audio priority mode the synchronization is carried out. Herein, re-synchronization is carried out when a user lowers the volume or carries out an operation regarding video or audio to be reproduced, such as enlargement of the video-displaying window. Further, at this time, synchronization is secured in response to the receiving timing of the video packet and audio packet as in the first embodiment or with priority placed on the video or audio which is not operated by a user. Operations for the re-synchronization are executed by the procedures similar to those in the first embodiment described above.

Thus, by carrying out re-synchronization in accordance with a change in the audio or video responsive to a user operation when a user carries out an operation regarding video or audio such as a lowering in the volume, it becomes possible to make disturbances in video and audio inconspicuous in the re-synchronization.

Figure 10A:
FIGS. 10(A) and 10(B) are views describing a configuration of a packet format of video and audio data according to a fourth embodiment.
Figure 10B:
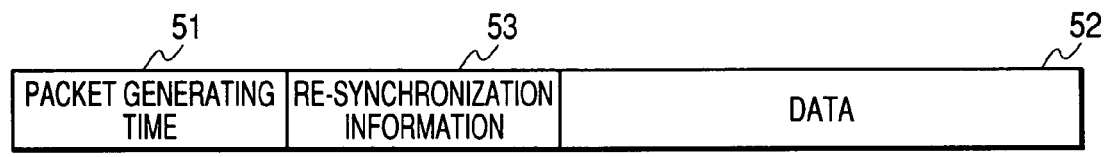

FIGS. 10(A) and 10(B) are views describing a configuration of a packet format of video and audio data according to a fourth embodiment.

As shown in FIG. 10(A), the packet format of video data and audio data which are transmitted in a network is generally configured so as to provide actual video and audio data 52 behind the header portion having the header information such as a packet generation time 51, etc. In the fourth embodiment, as shown in FIG. 10(B), re-synchronization information 53 is added behind the packet generation time 51 of the header portion, and the re-synchronization header is controlled by the re-synchronization information 53.

In this case, re-synchronization information is added to audio data by a transmission side apparatus. Video and audio are re-synchronized in accordance with the content and timing of the re-synchronization information by a receiving side apparatus. For example, if the audio level of the audio data becomes less than a prescribed value in the transmission side apparatus, re-synchronization information is added. The re-synchronization information may use flags [1] where re-synchronization is carried out and [0] where no re-synchronization is carried out or may use priority expressed in terms of numerical figures by digitizing the priority of re-synchronization. In addition, re-synchronization information is added to the video data as well, which may be used to control the re-synchronization.

Thus, by controlling the re-synchronization with re-synchronization information added to the audio data and video data at a timing favorable to carry out re-synchronization, it is possible to mitigate disturbances in the video and audio in re-synchronization. Also, in this case, it is not necessary to analyze audio data and video data at the receiving side apparatus, wherein the configuration regarding re-synchronization control can be simplified.

FIG. 11 is a block diagram showing a configuration of a video and audio reproducing apparatus including a video and audio synchronizing apparatus according to a fifth embodiment. And FIGS. 12(A) and 12(B) are views describing a configuration of a data format of video and audio data and measurement data according to the fifth embodiment.

In addition to the first embodiment shown in FIG. 1, a video and audio reproducing apparatus according to the fifth embodiment is provided with measurement signal generating portions (measurement signal generating means) 61 and 62 at the upstream sides of the video decoding portion 15 and the audio decoding portion 16 of the video and audio synchronizing portion 60, respectively, and is provided with measurement signal detecting portions (measurement signal detecting means) 63 and 64 and measurement data setting portions (measurement data setting means) 65 and 66 at the downstream sides of the video decoding portion 15 and the audio decoding portion 16, respectively.

The measurement signal generating portions 61 and 62 generate measurement data for which the measurement start time is set, and inserts the same into the video data and audio data, respectively. The measurement signal detecting portions 63 and 64 detect measurement data from the outputs of the video decoding portion 15 and audio decoding portion 16, and takes out the same therefrom. The measurement data setting portions 65 and 66 set the measurement stop time in the taken out measurement data and feeds the same back to the re-synchronization controlling portion 20.

Figure 12A:
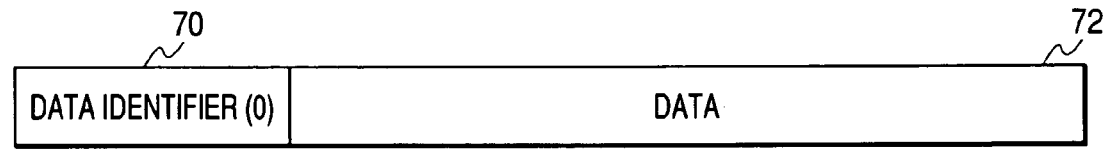
FIGS. 12(A) and 12(B) are views describing a configuration of a data format of video and audio data and measurement data according to the fifth embodiment.
Figure 12B:
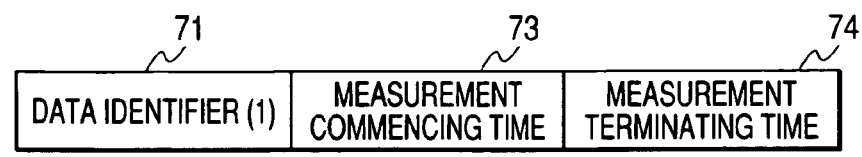

The data format of the video data and audio data received by the video receiving portion 11 and the audio receiving portion 12, respectively, is configured so that actual video and audio data 72 are provided behind the header portion having a data identifier [0] as shown in FIG. 12(A). Also, the measurement data are configured so that the measurement start time 73 and measurement stop time 74 are added behind the header portion having [1] of a data identifier 71 as shown in FIG. 12(B). With the measurement start time 73 and measurement stop time 74, it is possible to obtain an actual decoding process time in the video decoding portion 15 and the audio decoding portion 16, respectively.

In the measurement signal generating portions 61 and 62, measurement data added with the measurement start time set are generated, and are inserted into the video data and audio data, respectively. After these data are respectively decoded in the video decoding portion 15 and the audio decoding portion 16, the respective measurement data are detected by the measurement signal detecting portions 63 and 64 and are taken out therefrom. Measurement stop time is set to and added to the taken-out measurement data by the measurement data setting portions 65 and 66, and the taken-out measurement data are transmitted to the re-synchronization controlling portion 20. The re-synchronization controlling portion 20 calculates the decoding process time in the video decoding portion 15 and the audio decoding portion 16, respectively, on the basis of the measurement start time and measurement stop time, which are contained in the measurement data. Based on a difference between these decoding process times, the delay reference value is determined to control the video delay controlling portion 21 and audio delay controlling portion 22, whereby re-synchronization is carried out.

In the fifth embodiment, when the characteristics and decoding system of the video decoding portion 15 and the audio decoding portion 16 are changed or when another decoding portion is newly added, the decoding process time of the decoding portion is measured by using the measurement data, and the audio delay time (delay reference value) is set, whereby re-synchronization is carried out. Thereby, even if the video decoding portion or audio decoding portion is changed over, the delay reference value for synchronization is variably established in response to the characteristics of the decoding portions to enable re-synchronization.

In addition, in the respective embodiments described above, configurations are shown, which synchronize video and audio. However, the configurations may be applicable to not only combinations of video and audio but also combinations of various types of content data such as combinations of video to video and those of audio to audio, wherein it is possible to execute re-synchronization of reproduction data at an adequate timing without any hindrance.

The present invention is described in detail based on specified embodiments. However, it is obvious to ones skilled in the same art that the invention can be subjected to various alterations and modifications without departing from the spirit and scope of the invention.

The present application is based on Japanese Patent Application (No. 2001-330803) filed on Oct. 29, 2001, and the content of which is taken herein as a reference.

INDUSTRIAL APPLICABILITY

As described above, according to the present invention, it is possible to provide a video and audio synchronizing apparatus capable of mitigating disturbances in video and audio when re-synchronizing the same. In addition, it is possible to provide a video and audio synchronizing apparatus capable of variably setting the delay reference value for synchronization in accordance with the characteristics of the decoding portion.

The invention claimed is:

1. A video and audio synchronizing apparatus for re-synchronizing a reproducing timing of a plurality of content data including at least one of video data and audio data which are packetized and transmitted, comprising:
   means for judging a re-synchronization timing with respect to re-synchronization of one of the plurality of content data with another of the plurality of content data, based on one of:
   (a) an audio level of the audio data,
   (b) a result of comparing an I-frame of the video data to a previous frame,
   (c) a data transmission status, and
   (d) an operation by a user;
   means for determining a delay amount for synchronization at the re-synchronization timing;
   means for delaying at least the one of the plurality of content data on the basis of the delay amount; and
   means for analyzing the plurality of content data,
   wherein, on the basis of an analysis result brought about by the means for analyzing the plurality of content data, the means for judging the resynchronization timing judges, as the re-synchronization timing, a case where a differential between the I-frame of the video data and the previous frame is less than a prescribed value.

2. The video and audio synchronizing apparatus as set forth in claim 1, further comprising:
   means for judging priority, which judges which one of the plurality of content data is synchronized with priority.

3. The video and audio synchronizing apparatus as set forth in claim 2,
   wherein, on the basis of said or another analysis result brought about by the means for analyzing the plurality of content data, the means for judging priority judges that, where the plurality of content data are combinations of audio data and video data and a fluctuation in the arrival time of the audio data is shorter than the packet length of the audio data, the video data are synchronized with priority.

4. A video and audio synchronizing apparatus as set forth in claim 2,
   wherein, on the basis of said or another analysis result brought about by the means for analyzing the plurality of content data, the means for judging priority judges that, where the plurality of content data are combinations of audio data and video data and a fluctuation in the arrival time of the audio data is longer than the packet length of the audio data, the audio data are synchronized with priority.

5. The video and audio synchronizing apparatus as set forth in claim 2,
   wherein, on the basis of said or another analysis result brought about by the means for analyzing the plurality of content data, the means for judging priority judges priority of data to be resynchronized, in accordance with the content data.

6. The video and audio synchronizing apparatus as set forth in claim 1,
   wherein resynchronization information is added to the content data at prescribed timing suitable for re-synchronization when transmitting the content data, and the means for judging the re-synchronization timing judges the re-synchronization timing on the basis of the re-synchronization information.

* * * * *